US008401565B2

(12) United States Patent
Sandberg et al.

(10) Patent No.: US 8,401,565 B2
(45) Date of Patent: Mar. 19, 2013

(54) DELAYED EMERGENCY POSITION DETERMINATION AND TRANSMISSION

(75) Inventors: Jesper Sandberg, Valby (DK); Wing Kei Tang, San Diego, CA (US)

(73) Assignee: Nokia Corporation, Espoo (FI)

( * ) Notice: Subject to any disclaimer, the term of this patent is extended or adjusted under 35 U.S.C. 154(b) by 622 days.

(21) Appl. No.: 12/125,470

(22) Filed: May 22, 2008

(65) Prior Publication Data

US 2009/0291664 A1 Nov. 26, 2009

(51) Int. Cl.
*H04M 11/04* (2006.01)
*H04W 24/00* (2009.01)
(52) U.S. Cl. ............... 455/456.1; 455/404.1; 455/404.2; 455/457
(58) Field of Classification Search ............... 455/404.1, 455/404.2, 456.1–457
See application file for complete search history.

(56) References Cited

U.S. PATENT DOCUMENTS

| 5,677,837 | A | 10/1997 | Reynolds | |
|---|---|---|---|---|
| 6,973,298 | B2 * | 12/2005 | Chang et al. | 455/404.2 |
| 7,558,566 | B2 * | 7/2009 | Koskinen et al. | 455/424 |
| 2003/0236095 | A1 * | 12/2003 | Ross | 455/456.1 |
| 2006/0074555 | A1 | 4/2006 | Liu et al. | |
| 2007/0117571 | A1 * | 5/2007 | Musial | 455/456.1 |
| 2008/0096521 | A1 * | 4/2008 | Boling et al. | 455/404.2 |
| 2008/0132249 | A1 | 6/2008 | Hamilton | |
| 2008/0318598 | A1 | 12/2008 | Fry | |
| 2009/0143079 | A1 * | 6/2009 | Klassen et al. | 455/456.3 |

FOREIGN PATENT DOCUMENTS

DE 19817962 A1 10/1999

OTHER PUBLICATIONS

"International Search Report and Written Opinion," PCT/FI2009/050151, mailed Jun. 10, 2009.
Office Action for Chinese Application No. 200980116724.X dated Nov. 2, 2012.

* cited by examiner

*Primary Examiner* — Wesley Kim
(74) *Attorney, Agent, or Firm* — Alston & Bird LLP

(57) ABSTRACT

A method including detecting a communication call attempt in a portable communication device, determining whether the portable communication device is outside of a communication network coverage area, determining a location of the portable communication device where the communication call attempt is detected if outside of the communication network coverage area with a position determining module of the portable communication device and storing the location in a memory of the portable communication device, determining at least one route from the location of the portable communication device where the communication call attempt is detected to at least one communication network coverage area with a navigation module of the portable communication device and presenting the at least one route on a display of the portable communication device.

18 Claims, 10 Drawing Sheets

DELAYED EMERGENCY POSITION DETERMINATION AND TRANSMISSION

BACKGROUND

1. Field

The disclosed embodiments generally relate to location determination of an emergency call and, more particularly to a system to determine and transmit a location of an out of network emergency call.

2. Brief Description of Related Developments

Situations may arise when a user of a portable communication device, such as for example, a cellular telephone, may be at a location where there is no communication network coverage. Examples of these situations include, but are not limited to, when users go hiking, mountain climbing or engage in other outdoor activities or when the user's car breaks down. It may be troublesome and/or irritating to the user if the user attempts to make a call in an area where there is no network coverage and the user does not know which direction to travel so that the user enters an area with network coverage. Knowing which direction to travel to obtain network coverage is particularly important in emergency situations. For example, communication devices equipped with global positioning systems (GPS) cannot transmit a location of the communication device to emergency personnel in areas with no network coverage.

It would be advantageous to indicate to a user which direction to travel in order to re-establish a communication connection so that communication may be made within the network coverage area. It would also be advantageous to provide emergency personnel with a location of an emergency when the initial call is placed from an area with limited or no network coverage.

SUMMARY

The aspects of the disclosed embodiments are directed to a method including detecting a communication call attempt in a portable communication device, determining whether the portable communication device is outside of a communication network coverage area, determining a location of the portable communication device where the communication call attempt is detected if outside of the communication network coverage area with a position determining module of the portable communication device and storing the location in a memory of the portable communication device, determining at least one route from the location of the portable communication device where the communication call attempt is detected to at least one communication network coverage area with a navigation module of the portable communication device and presenting the at least one route on a display of the portable communication device.

Other aspects of the disclosed embodiments are directed to an apparatus including a display and a processor operably connected to the display, the processor being configured to detect a communication call attempt made with the apparatus, determine whether the apparatus is outside of a communication network coverage area, determine a location of the apparatus where the communication call attempt is detected if outside of the communication network coverage area, store the location of the apparatus where the communication call attempt is detected in a memory connected to the processor, determine at least one route from the location of the apparatus where the communication call attempt is detected to at least one communication network coverage area and present the at least one route on the display for guiding a user to the at least one communication network coverage area.

Still other aspects of the disclosed embodiments are directed to a user interface including a processor configured to detect a communication call attempt made with a communication device, determine whether the communication call attempt is made outside of a communication network coverage area, determine a location of the communication device where the communication call attempt is detected if outside of the communication network coverage area, store the location of the communication device where the communication call attempt is detected in a memory connected to the processor, determine a first route from the location of the communication device where the communication call attempt is detected to at least one communication network coverage area and a display area configured to present the first route for guiding a user from the first location to the second location.

BRIEF DESCRIPTION OF THE DRAWINGS

The foregoing aspects and other features of the embodiments are explained in the following description, taken in connection with the accompanying drawings, wherein.

DETAILED DESCRIPTION OF THE EMBODIMENT(s)

Figure 1:
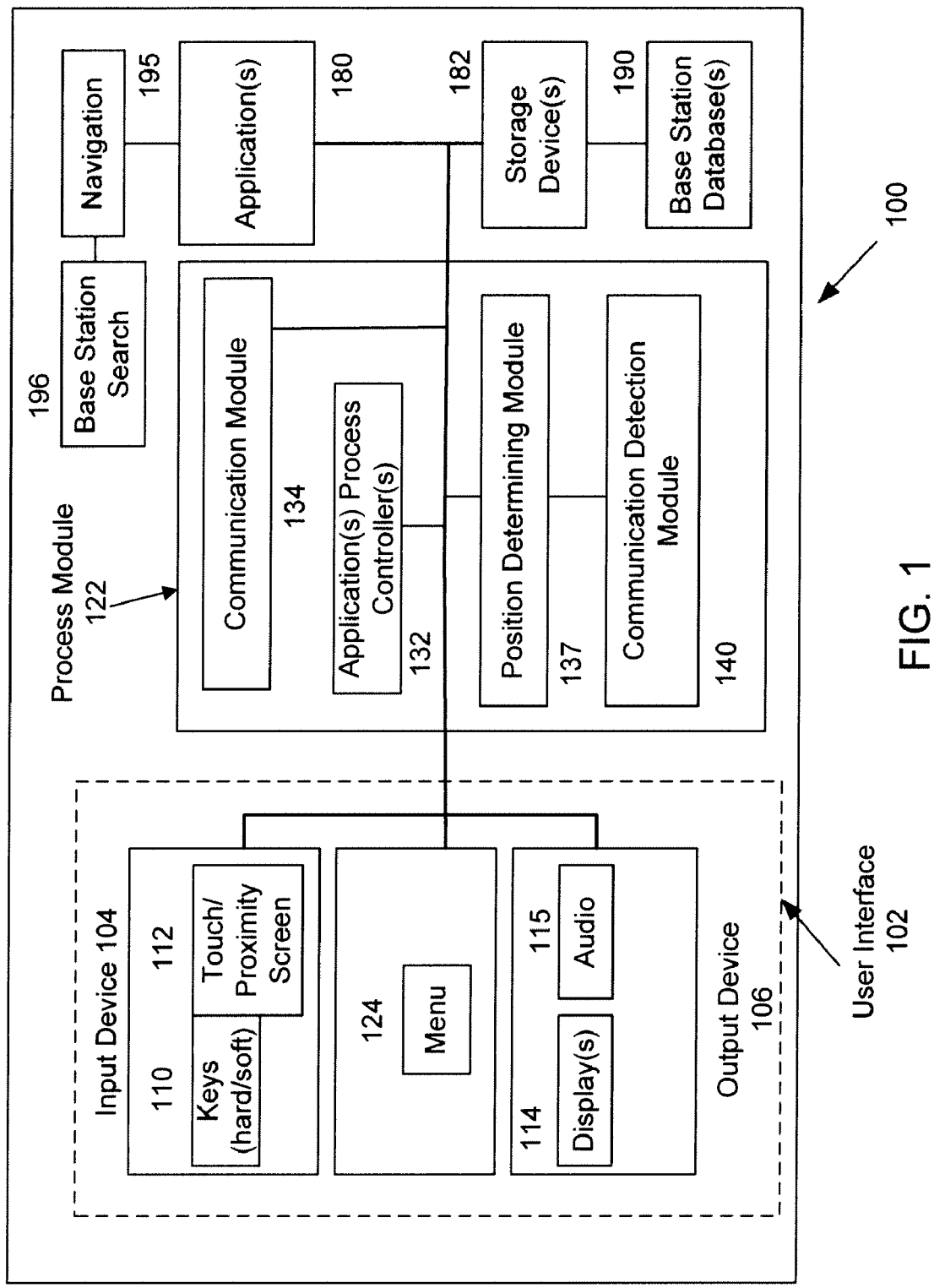
FIG. 1 shows a block diagram of a system in which aspects of the disclosed embodiments may be applied.

FIG. 1 illustrates one embodiment of a system 100 in which aspects of the disclosed embodiments can be applied. Although the disclosed embodiments will be described with reference to the embodiments shown in the drawings and described below, it should be understood that these could be embodied in many alternate forms. In addition, any suitable size, shape or type of elements or materials could be used.

Figure 2:
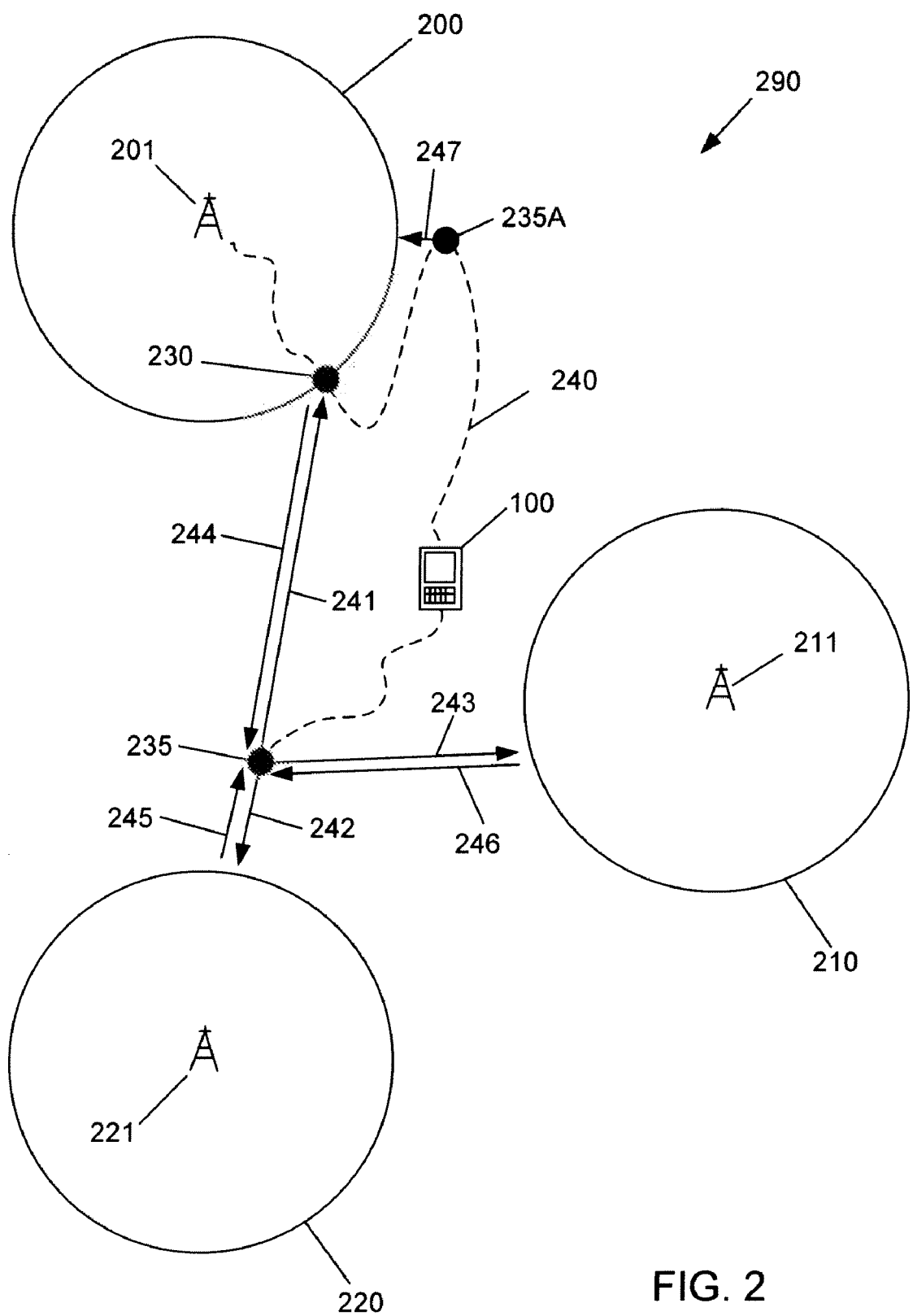
FIG. 2 illustrates an environment in which aspects of the disclosed embodiments may be used.

Referring also to FIG. 2, the aspects of the disclosed embodiments will allow for the recordation of areas of known communication network coverage 200, 210, 220 and/or incident locations 235. The aspects of the disclosed embodiments will also guide a user of the system 100 to areas of network coverage 200, 210, 220 to allow communications to be established. It is noted that communication as used herein may be any suitable communication including, but not limited to voice communication, instant messages, text messages, email, data transfers or any combination thereof made on any suitable network. Other aspects of the disclosed embodiments will guide the user from areas of network coverage 200, 210, 220 back to the incident locations 235 (with limited or no network coverage) after making a communication. For example, when a user of the system 100 is traveling along a path of travel 240 in an area where there is no communication network coverage, the user cannot establish communications with the system 100 in cases of, for example, emergency. The aspects of the disclosed embodiments can determine a location of the system 100 and guide a user to a location or area 200, 210, 220 where there is network coverage so that a communication or an emergency communication may be established. Aspects of the disclosed embodiments also record locations (e.g. incident locations) where a communication attempt is made in areas of no network coverage. These recorded incident locations 235 can be sent at a later time, such as when the user enters a network coverage area 200, 210, 220, to emergency personnel so that the emergency personnel can have the incident location 235. Providing the emergency personnel with the incident location 235 may save valuable time in instances where the user of the system 100 cannot make the call or contact directly from the incident location 235. For example, the emergency personnel will not have to rely on the user to provide the actual location of the emergency as the system 100 stores and automatically transmits the location of the emergency to the emergency personnel. It is noted that while the aspects of the disclosed embodiments will be described herein with respect to emergency communications, the aspects of the disclosed embodiments are not limited thereto. For example, the aspects of the disclosed embodiments may be used to determine a location of network coverage in any situation where the user cannot find network coverage during non-emergency communications.

Figure 3A:
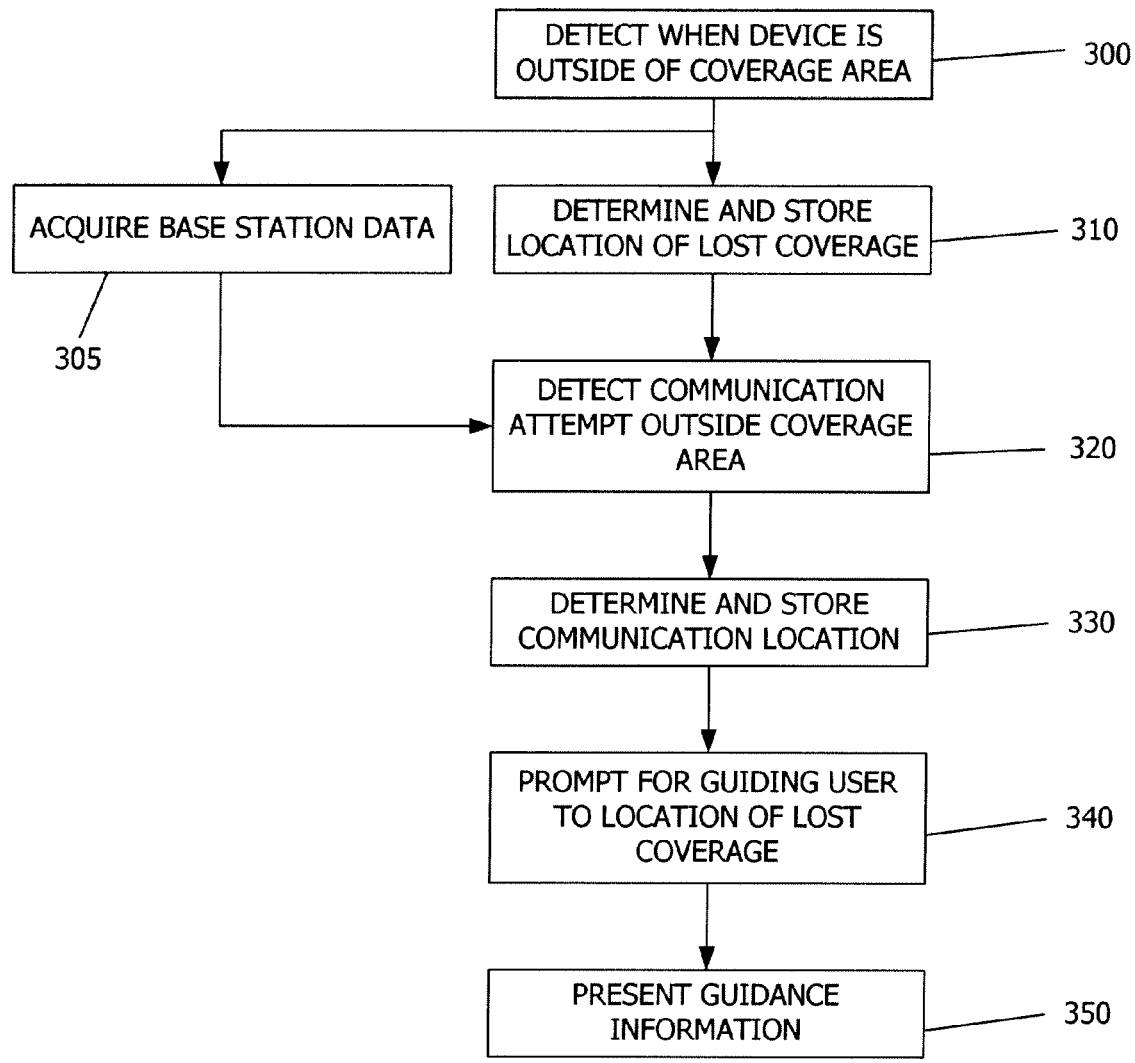
FIGS. 3A and 3B illustrate flow diagrams according to aspects of the disclosed embodiments.

Referring also to FIGS. 1 and 3A, in one aspect the system 100 is configured to detect when the system 100 is moving outside of a communication network coverage area (e.g. an area where the network signal strength is not adequate to support communication) such as coverage area 200 (FIG. 3A, Block 300). A record is kept within, for example, a storage device/memory 182, of the system 100 regarding areas of network coverage 200, 210, 220. For example, the system 100 may be configured to locate the nearest base station 201, 211, 221 or coverage area 200, 210, 220 of the communication network 290 so that a user of the system 100 will know which direction to travel to obtain network coverage. In one aspect the system 100 may include a database 190 of base station locations in the vicinity of the system 100. The information in the database 190 may be populated by downloading or otherwise acquiring (such as through portable computer readable media or other data transfer methods) a base station coverage map database from, for example, a network service provider or any other suitable source including, but not limited to the Internet (FIG. 3A, Block 305). The base station coverage map database may provide base station locations for predetermined areas or for the entire network. For example, if the user is travelling to Naples, Italy in one aspect the system 100 may download information for base stations located in Naples. In other aspects the system 100 may download base station information for base stations located within an entire communication network which includes Naples. In other aspect the downloaded base station database may correspond to base stations located in any suitable geographical area(s). The downloading of the base station locations may be automatic or may be user initiated. In other embodiments, the downloading of the base station locations may be initiated in any suitable manner. In one aspect the system 100 may include a base station search application 196, which when activated may also activate a navigation application 195 and/or position determination module 137 of the system 100 to determine a location of the system 100 (if the location of the system 100 is not already known) and find a location of the nearest base station(s) based on the location of the system 100. The base station or coverage information provided by the base station search application 196 may correspond to, for example, any available network (such as in emergency situations), a home network (for personal communications and data service), any predetermined carrier (to select a network for roaming communications such as when a user is outside the home network) or any suitable combination thereof. The coverage information provided by the base station search application 196 and the networks for which the base station search application 196 searches for may be user selectable in any suitable manner such as through any suitable settings menu of the system.

In another aspect the system 100 may be configured to determine a location 230 where the communication network signal is lost (i.e. the last known network signal) and record that location in, for example, memory 182 (FIG. 3A, Block 310). As can be seen in FIG. 2, as the user travels along path 240 the user leaves communication network 200 at point 230. The location of point 230 is determined by, for example, a position determining module 137 of the system 100 and is stored in the memory 182 as the last known network signal. The position may be determined using, for example, a global positioning system or other suitable positioning methods as described herein. The determination of the location where the communication network signal is lost may be made by the system using, for example, any suitable positioning system such as position determination module 137. In one aspect, for example, the position determination module 137 and navigation application 195 may monitor the location of the system 100 as the user travels, which in this example is along path 240. At the location 230 where the communication network signal strength is no longer adequate for communications the system 100 may record the location for future reference in the event the user attempts to make a call in an area where there is no network coverage. In alternate embodiments, any suitable method can be used to determine when network coverage is limited or lost, and store the corresponding location.

The system 100 also includes a communication detection module 140 for detecting communication attempts made in areas of no network coverage (FIG. 3A, Block 320). Upon detection of a communication attempt in an area of no network coverage the system 100 is configured to determine the location of the system 100 using, for example, the position determination module 137 or any other suitable position determining device. For explanation purposes only, the location of the communication attempt will be referred to herein as the incident location 235 but it should be understood that the location of the communication attempt may be any suitable location. The system is configured to record the incident location 235 in, for example, memory 182. (FIG. 3A, Block 330). Although only one incident location is being described herein, in other examples, the system 100 may be configured to determine and store more than one incident location.

When, for example, the system 100 detects that a call being attempted outside a network coverage area 200, 210, 220 the system 100 may be configured to prompt the user of the system 100 with respect to a location(s) of one or more coverage areas 200, 210, 220 in any suitable manner (FIG. 3A, Block 340). In one aspect, based on criteria for selecting a route, the system 100 may query the user if a route to a known network coverage area should be determined as will be described below. The criteria for determining the route 241, 242, 243, 247 may be settable using, for example, any suitable settings menu of the system 100. In other aspects route options may be presented to the user for determining the route including, but not limited to, the determination of the shortest route, the fastest route and a route to the last known coverage area. In other aspects the system 100 may compare the incident location 235 to the base station database 190 and/or the location of the last known network signal 230 and determine the best route 241, 242, 243, 247 leading back to an area of communication network coverage 200, 210, 220. The route 241, 242, 243, 247 can be determined by the system 100 depending on any suitable criteria. This can include, for example, route options selected by the user such as a fastest or shortest route to a communication network coverage area, a route to the closest communication network coverage area, a route back to the last known communication network coverage area, or a predetermined coverage area corresponding to, for example, a predetermined network provider. In one example, as can be seen in FIG. 2, where a call is attempted from location 235A a shortest route 247 may be determined 247 even though the loss of the communication network signal was determined at point 230. In other aspects the terrain may be considered by the system 100 when determining the route 241, 242, 243. For example, if an impasse, such as a river or canyon, is located between incident location 235 and network coverage area 220 along path 242, the system 100 may determine that route 241 or 243 is the better path even though route 242 is the shortest route. In other aspects, the health of the user of system 100 may be considered when determining the path so as not to aggravate any health conditions (e.g. asthma, inability to traverse rough terrain, broken bones or any other physical or mental condition) of the user. For example, the system 100 may be configured to inquire about the health of the user (e.g. broken bones) before determining the route.

Figure 4:
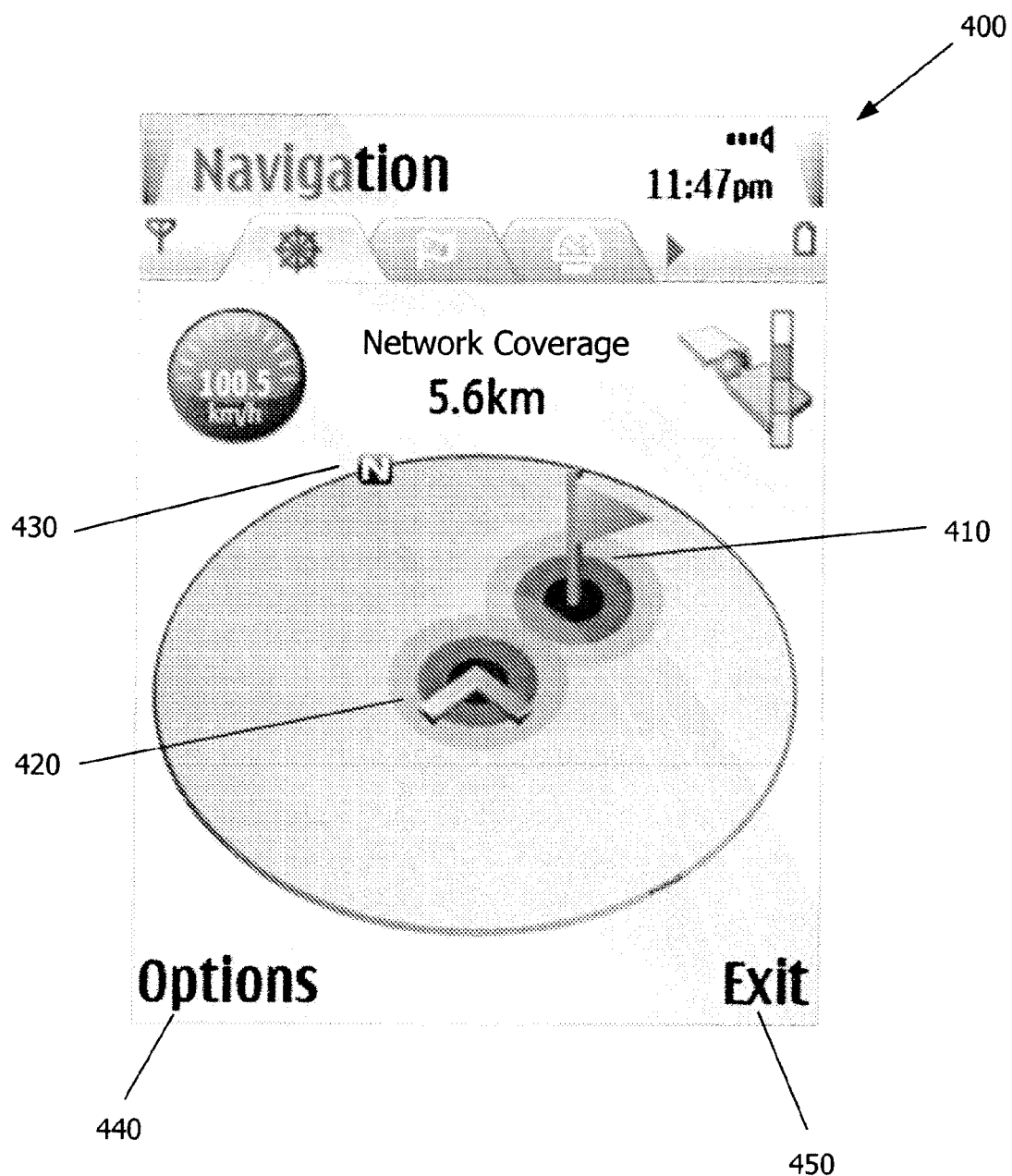
FIGS. 4 and 5 are exemplary screen shots of a user interface in a system incorporating aspects of the disclosed embodiments.

The determined route 210, 242, 243 may be presented to the user in any suitable manner (FIG. 3A, Block 350). In one aspect, the navigation application 195 may be configured to present a navigational map to the user including, for example, the route guidance as shown in FIG. 4. As can be seen in FIG. 4, the route 241, 242, 243 may be presented on a display 114 of the system. In another example, presentation of the route may also include any suitable audible instructions presented through an audio feature 115 of the system 100 such as a loudspeaker. In this example, the route presentation 400 includes a heading indicator 430, a network coverage indicator 410 and a user location indicator 420. Any other suitable information may also be presented, including, but not limited to, a distance to the network coverage area, a GPS signal strength and the speed at which the user is traveling. An options soft key 440 may also be presented allowing the user to select any suitable options such as the format of the display (e.g. 3-D as shown in FIG. 4 or a topographical format) and/or the amount of detail shown on the map. An exit soft key 450 may also be provided allowing the user to exit the navigation application 195 at any suitable time. As can be seen in FIG. 4, the user location indicator 420 may point in the direction the user is travelling so that the user can follow the pointer to the desired destination, which in this case is the coverage area 200, 210, 220 (represented by indicator 410) corresponding to a respective base station 201, 211, 221.

In one aspect of the disclosed embodiments, when the user reaches, for example, the coverage area 200, 210, 220 corresponding to the network coverage indicator 410 the user may establish communications over the communication network in any suitable manner. Here the navigation provided by the system may be terminated so that the user can establish communications without any further prompting by the system.

Figure 3B:
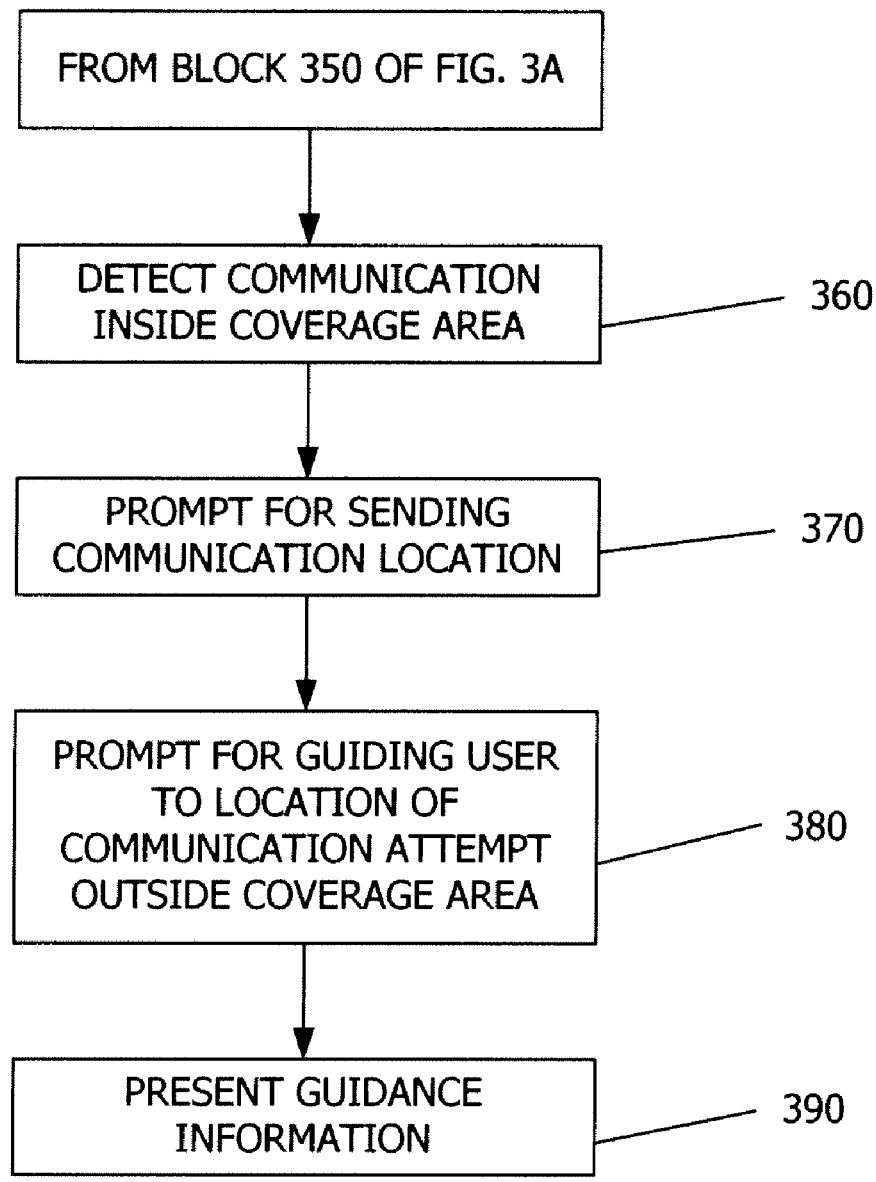

In another aspect, referring to FIG. 3B, the system 100 may be configured to detect the first communication made within the coverage area 200, 210, 220 (FIG. 3B, Block 360). The first communication made will be referred to herein as the emergency communication for exemplary purposes only and may be the first successful communication made with the system 100 over the network after the incident location 235 has been stored (e.g. after the communication attempt was detected for the communication made outside the coverage area, see FIG. 3A, Block 320). In other examples, the first communication made may not correspond to an emergency. In one example, upon detection of the emergency communication the system 100 may prompt the user in any suitable manner for sending the stored incident location 235 to a recipient of the emergency communication (FIG. 3B, Block 370). If the user indicates that the incident location is to be sent, the system 100 sends the stored incident location 235 to the recipient when, for example, the network initiates a location request during the emergency communication. In other examples, the location information may be sent to the recipient at any suitable time including, but not limited to, before or after the communication. It is noted that where more than one incident location is stored a selection of incident locations may be presented to the user for selecting one or more incident locations to send to the recipient of the emergency communication. In another example, in addition to sending the incident location 235 the system 100 may also prompt the user for sending a current location of the user to the recipient of the emergency communication in the event the user can no longer travel to another location, such as back to the incident location 235 (e.g. where the user is injured or otherwise incapacitated). The current location of the user (and the system 100) may be determined with, for example, the position determining systems described above. Sending the incident location 235 and/or the current location of the user to the recipient of the emergency communication allows one or more emergency personnel to be dispatched directly to each of the incident location 235 and/or to the current location of the user for administering aid to the necessary parties. If the user indicates that the incident location (and/or current user location) is not to be sent to the recipient of the emergency communication, the communication is considered to be a non-emergency communication and further prompting by the system is terminated with respect to, for example, the determination of the routes and coverage areas described herein.

Figure 5:
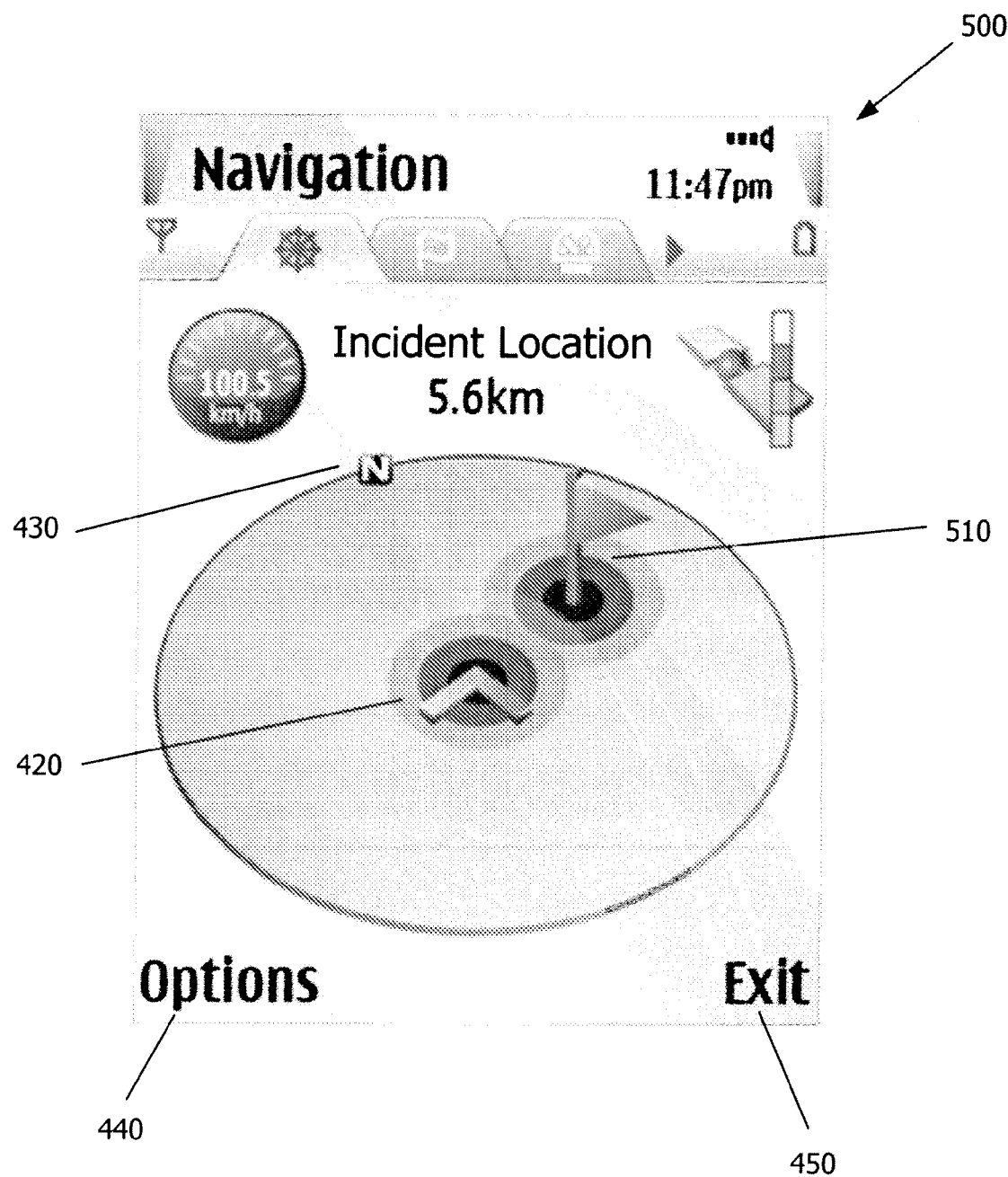

In a further aspect the system 100 may present a prompt to the user for presenting navigation information back to the incident location 235 (e.g. a return route) (FIG. 3B, Block 380). In one example, if the user indicates that navigation back to the incident location 235 is to be presented the system 100 determines a route 244, 245, 246 back to the incident location 235 in a manner substantially similar to the determination of route 241, 242, 243 as described above. The route 244, 245, 246 may be presented by the system 100 in any suitable manner such as through the display 114 or audio feature 115 as described above with respect to FIG. 4 (FIG. 3B, Block 390). An example of the route presentation 500 back to the incident location 235 is shown in FIG. 5. The route presentation 500 may be substantially similar to route presentation 400 and like features have like reference numerals. In route presentation 500 however, an incident location indicator 510 is presented.

Referring again to FIG. 1, the system 100 of the disclosed embodiments can include input device 104, output device 106, process module 122, applications module 180, and storage/memory 182. The components described herein are merely exemplary and are not intended to encompass all components that can be included in the system 100. The device 100 can also include one or more processors to execute the processes, methods and instructions described herein. The processors can be stored in the device 100, or in alternate embodiments, remotely from the device 100.

The input device 104 is generally configured to allow a user to input data and commands to the system or device 100. The input device 104 may include any suitable input features including, but not limited to hard and/or soft keys 110 and touch/proximity screen 112. The output device 106 is configured to allow information and data to be presented to the user via the user interface 102 of the device 100. The process module 122 is generally configured to execute the processes and methods of the disclosed embodiments. The application process controller 132 can be configured to interface with the applications module 180 and execute applications processes with respects to the other modules of the system 100. The communication module 134 is configured to allow the device to receive and send communications and messages, such as voice calls, text messages, chat messages and email. The communications module 134 is also configured to receive communications from other devices and systems. The position determination module 137 may be configured as, for example, a GPS receiver. The position determination module 137 may also include position determination features (that may supplement the GPS receiver and/or be used in lieu of the GPS receiver) that allow for tracking a location of the system when there is no GPS signal such as in areas of densely packed trees with significant canopy coverage, in tunnels, under overpasses or in any other suitable areas where communication with GPS satellites cannot be established. For example, the position determination module 137 may include an automatic tracking system including, but not limited to, dead reckoning or inertial navigation systems for determining a location of the system 100 when there is no GPS signal. The communication detection module 137 may be configured to detect when communication attempts are made with the system 100 and cause an activation of the position determination module 137 and/or navigation application 195 as described above.

The applications module 180 can include any one of a variety of applications or programs that may be installed, configured or accessible by the device 100. In one embodiment the applications module 180 can include navigation applications 195, base station search applications 196, maps, web browser, office, business, media player and multimedia applications. The applications or programs can be stored directly in the applications module 180 or accessible by the applications module. For example, in one embodiment, an application or program such as base station search application 196 may be communication network based, and the applications module 180 includes the instructions and protocols to access the program and render the appropriate user interface and controls to the user.

In one embodiment, the system 100 comprises a mobile communication device. The mobile communication device can be Internet enabled. The input device 104 can also include a camera or such other image capturing system. In one aspect, the system 100 may be configured to send pictures taken of the incident location 235 along with the location information to the recipient of the emergency communication to alert the emergency personnel of a condition of an injured party or of the terrain that the emergency personnel will traverse. This may aid the emergency personnel in preparing for treatment and selecting an appropriate mode of transportation. The applications of the device may include, but are not limited to, data acquisition (e.g. image, video and sound) and multimedia players (e.g. video and music players) and gaming, for example. In alternate embodiments, the system 100 can include other suitable devices, programs and applications.

While the input device 104 and output device 106 are shown as separate devices, in one embodiment, the input device 104 and output device 106 can be combined and be part of and form the user interface 102. The user interface 102 can be used to display information pertaining to content, control, inputs, objects and targets as described herein.

The display 114 of the system 100 can comprise any suitable display, such as a touch screen display, proximity screen device or graphical user interface. The type of display is not limited to any particular type or technology. In other alternate embodiments, the display may be any suitable display, such as for example a flat display 114 that is typically made of a liquid crystal display (LCD) with optional back lighting, such as a thin film transistor (TFT) matrix capable of displaying color images.

In one embodiment, the user interface of the disclosed embodiments can be implemented on or in a device that includes a touch screen display or a proximity screen device 112. In alternate embodiments, the aspects of the user interface disclosed herein could be embodied on any suitable device that will display information and allow the selection and activation of applications or system content. The terms "select" and "touch" are generally described herein with respect to a touch screen-display. However, in alternate embodiments, the terms are intended to encompass the required user action with respect to other input devices. For example, with respect to a proximity screen device, it is not necessary for the user to make direct contact in order to select an object or other information. Thus, the above noted terms are intended to include that a user only needs to be within the proximity of the device to carry out the desired function.

Similarly, the scope of the intended devices is not limited to single touch or contact devices. Multi-touch devices, where contact by one or more fingers or other pointing devices can navigate on and about the screen, are also intended to be encompassed by the disclosed embodiments. Non-touch devices are also intended to be encompassed by the disclosed embodiments. Non-touch devices include, but are not limited to, devices without touch or proximity screens, where navigation on the display and menus of the various applications is performed through, for example, keys 110 of the system or through voice commands via voice recognition features of the system.

Figure 6A:
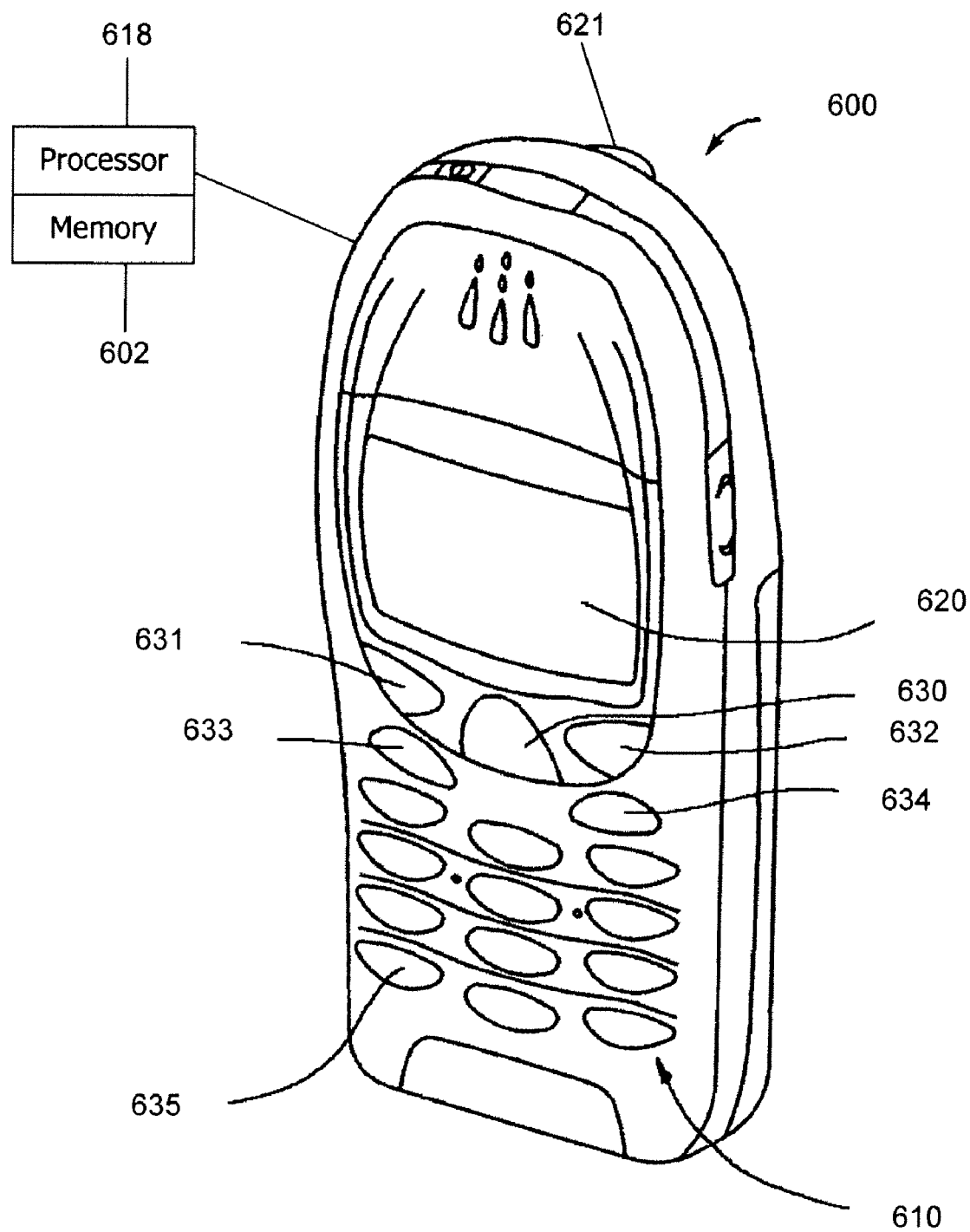
FIGS. 6A and 6B are illustrations of exemplary devices that can be used to practice aspects of the disclosed embodiments.
Figure 6B:
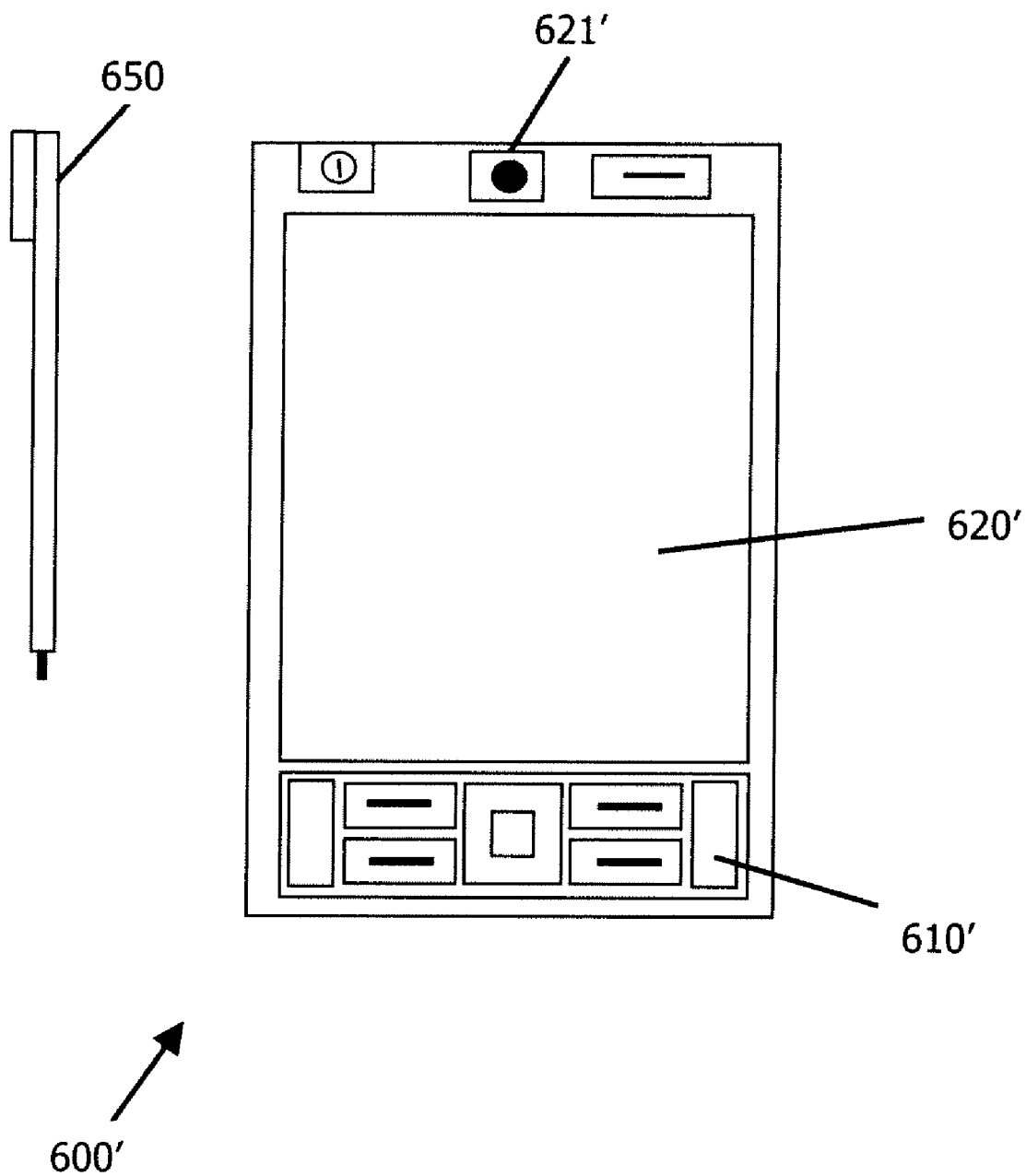

Some examples of devices on which aspects of the disclosed embodiments can be practiced are illustrated with respect to FIGS. 6A and 6B. The devices are merely exemplary and are not intended to encompass all possible devices or all aspects of devices on which the disclosed embodiments can be practiced. The aspects of the disclosed embodiments can rely on very basic capabilities of devices and their user interface. Buttons or key inputs can be used for selecting the various selection criteria or options such as those described above with respect to FIGS. 3A and 3B.

As shown in FIG. 6A, in one embodiment, the terminal or mobile communications device 600 may have a keypad 610 as an input device and a display 620 for an output device. The keypad 610 may include any suitable user input devices such as, for example, a multi-function/scroll key 630, soft keys 631, 632, a call key 633, an end call key 634 and alphanumeric keys 635. In one embodiment, the device 600 includes an image capture device such as a camera 621 as a further input device. The display 620 may be any suitable display, such as for example, a touch screen display or graphical user interface. The display may be integral to the device 600 or the display may be a peripheral display connected or coupled to the device 600. A pointing device, such as for example, a stylus, pen or simply the user's finger may be used in conjunction with the display 620 for cursor movement, menu selection and other input and commands. In alternate embodiments any suitable pointing or touch device, or other navigation control may be used. In other alternate embodiments, the display may be a conventional display. The device 600 may also include other suitable features such as, for example a loud speaker, tactile feedback devices or connectivity port. The mobile communications device may have a processor 618 connected or coupled to the display for processing user inputs and displaying information on the display 620. A memory 602 may be connected to the processor 618 for storing any suitable information, data, settings and/or applications associated with the mobile communications device 600 such as those described above.

Figure 7:
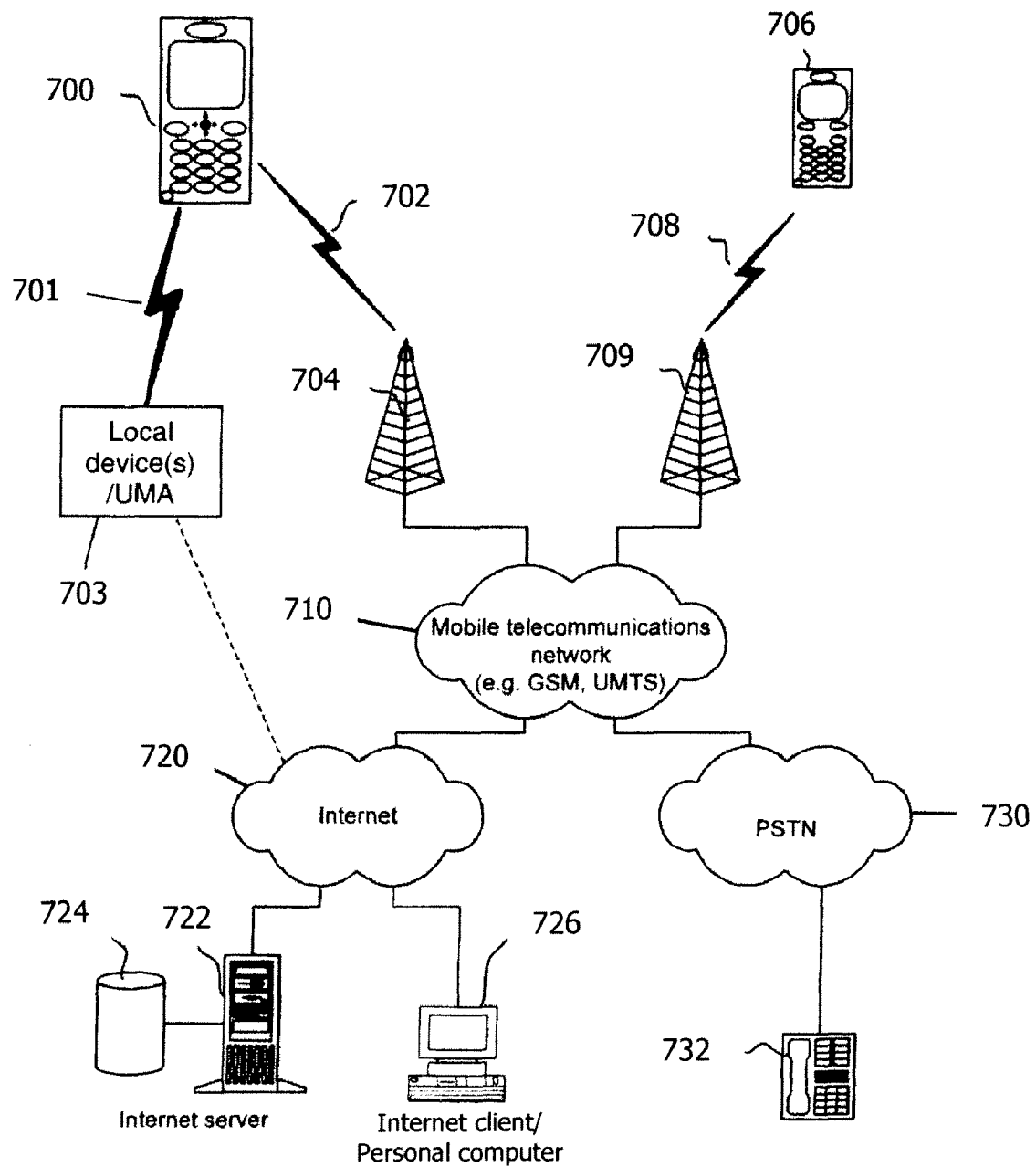
FIG. 7 illustrates a block diagram of an exemplary system incorporating features that may be used to practice aspects of the disclosed embodiments.

In the embodiment where the device 600 comprises a mobile communications device, the device can be adapted for communication in a telecommunication system, such as that shown in FIG. 7. In such a system, various telecommunications services such as cellular voice calls, worldwide web/wireless application protocol (www/wap) browsing, cellular video calls, data calls, facsimile transmissions, data transmissions, music transmissions, still image transmission, video transmissions, electronic message transmissions and electronic commerce may be performed between the mobile terminal 700 and other devices, such as another mobile terminal 706, a line telephone 732, an internet client/personal computer 726 and/or an internet server 722.

In one embodiment the system is configured to enable any one or combination of voice communication, chat messaging, instant messaging, text messaging and/or electronic mail. It is to be noted that for different embodiments of the mobile terminal 700 and in different situations, some of the telecommunications services indicated above may or may not be available. The aspects of the disclosed embodiments are not limited to any particular set of services or applications in this respect.

The mobile terminals 700, 706 may be connected to a mobile telecommunications network 710 through radio frequency (RF) links 702, 708 via base stations 704, 709. The mobile telecommunications network 710 may be in compliance with any commercially available mobile telecommunications standard such as for example global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 710 may be operatively connected to a wide area network 720, which may be the Internet or a part thereof. A server, such as Internet server 722 can include data storage 724 and processing capability and is connected to the wide area network 720, as is an Internet client/personal computer 726. The server 722 may host a worldwide web/wireless application protocol server capable of serving worldwide web/wireless application protocol content to the mobile terminal 700.

A public switched telephone network (PSTN) 730 may be connected to the mobile telecommunications network 710 in a familiar manner. Various telephone terminals, including the stationary line telephone 732, may be connected to the public switched telephone network 730.

The mobile terminal 700 is also capable of communicating locally via a local link(s) 701 to one or more local devices 703. The local link(s) 701 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 703 can, for example, be various sensors that can communicate measurement values or other signals to the mobile terminal 700 over the local link 701. The above examples are not intended to be limiting, and any suitable type of link may be utilized. The local devices 703 may be antennas and supporting equipment forming a wireless local area network implementing Worldwide Interoperability for Microwave Access (WiMAX, IEEE 802.16), WiFi (IEEE 802.11x) or other communication protocols. The wireless local area network may be connected to the Internet. The mobile terminal 700 may thus have multi-radio capability for connecting wirelessly using mobile communications network 710, wireless local area network or both. Communication with the mobile telecommunications network 710 may also be implemented using WiFi, Worldwide Interoperability for Microwave Access, or any other suitable protocols, and such communication may utilize unlicensed portions of the radio spectrum (e.g. unlicensed mobile access (UMA)). In one embodiment, the communications module 134 is configured to interact with, and communicate to/from, the system described with respect to FIG. 7.

Although the above embodiments are described as being implemented on and with a mobile communication device, it will be understood that the disclosed embodiments can be practiced on any suitable device incorporating a display, processor, memory and supporting software or hardware. For example, the disclosed embodiments can be implemented on various types of music, gaming and/or multimedia devices with one or more communication capabilities as described above. In one embodiment, the system 100 of FIG. 1 may be for example, a personal digital assistant (PDA) style device 600' illustrated in FIG. 6B. The personal digital assistant 600' may have a keypad 610', a touch screen display 620', camera 621' and a pointing device 650 for use on the touch screen display 620'. In still other alternate embodiments, the device may be a personal computer, a tablet computer, touch pad device, Internet tablet, a laptop computer, a mobile terminal, a cellular/mobile phone, a multimedia device, a personal communicator or any other suitable device capable of containing for example a display 114 shown in FIG. 1, and supported electronics such as the processor 618 and memory 602 of FIG. 6A. In one embodiment, these devices will be communication enabled over a wireless network and can include map and GPS capability.

The user interface 102 of FIG. 1 can also include menu systems 124 coupled to the processing module 122 for allowing user input and commands. The process module 122 provides for the control of certain processes of the system 100 including, but not limited to the controls for determining communication attempts and travel routes. The menu system 124 can provide for the selection of different tools and application options related to the applications or programs running on the system 100 in accordance with the disclosed embodiments. The menu system 124 may also provide for disabling the route determination and location transmitting features described herein. In the embodiments disclosed herein, the process module 122 receives certain inputs, such as for example, signals, transmissions, instructions or commands related to the functions of the system 100. Depending on the inputs, the process module 122 interprets the commands and directs the process control 132 to execute the commands accordingly in conjunction with the other modules and/or applications, such as for example, position determination module 137, communication detection module 140, communication module 134, navigation application 195 and base station search application 196. In accordance with the embodiments described herein, this can include determining a route to an area of communication network coverage and transmitting an incident location to emergency personnel.

Figure 8:
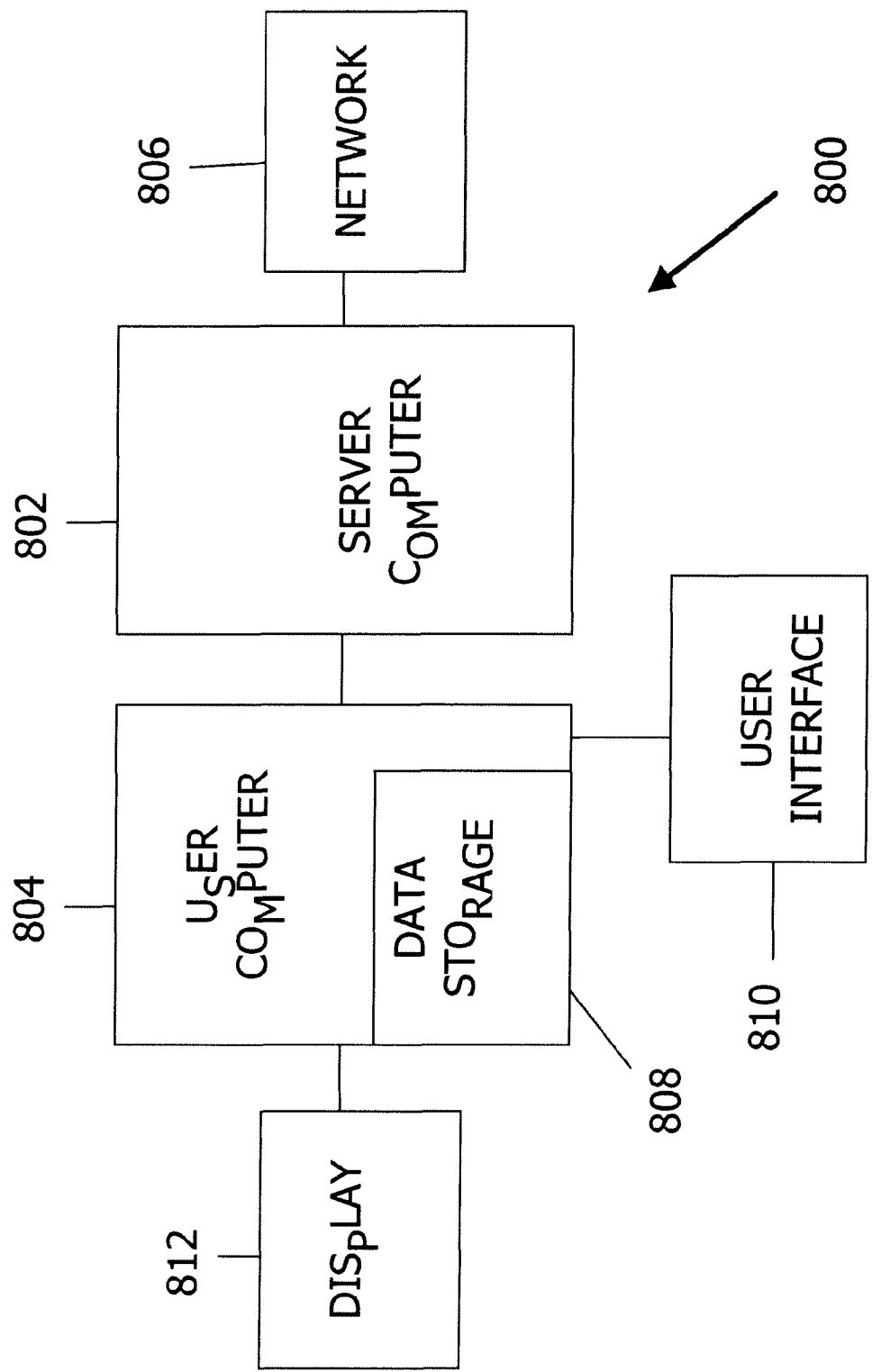
FIG. 8 is a block diagram illustrating the general architecture of an exemplary system in which the devices of FIGS. 6A and 6B may be used.

The disclosed embodiments may also include software and computer programs incorporating the process steps and instructions described above. In one embodiment, the programs incorporating the process steps described herein can be stored on and/or executed in one or more computers. FIG. 8 is a block diagram of one embodiment of a typical apparatus 800 incorporating features that may be used to practice aspects of the disclosed embodiments. The apparatus 800 can include computer readable program code means for carrying out and executing the process steps described herein. In one embodiment the computer readable program code is stored in a memory of the device. In alternate embodiments the computer readable program code can be stored in memory or a memory medium that is external to, or remote from, the apparatus 800. The memory can be directly coupled or wirelessly coupled to the apparatus 800. As shown, a computer system 802 may be linked to another computer system 804, such that the computers 802 and 804 are capable of sending information to each other and receiving information from each other. In one embodiment, computer system 802 could include a server computer adapted to communicate with a network 806. Alternatively, where only one computer system is used, such as computer 804, computer 804 will be configured to communicate with and interact with the network 806. Computer systems 802 and 804 can be linked together in any conventional manner including, for example, a modem, wireless, hard wire connection, or fiber optic link. Generally, information can be made available to both computer systems 802 and 804 using a communication protocol typically sent over a communication channel or other suitable communication channel or link. In one embodiment, the communication channel comprises a suitable broad-band communication channel. Computers 802 and 804 are generally adapted to utilize program storage devices embodying machine-readable program source code, which is adapted to cause the computers 802 and 804 to perform the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks, memory sticks, flash memory devices and other semiconductor devices, materials and chips.

Computer systems 802 and 804 may also include a microprocessor for executing stored programs. Computer 802 may include a data storage device 808 on its program storage device for the storage of information and data. The computer program or software incorporating the processes and method steps incorporating aspects of the disclosed embodiments may be stored in one or more computers 802 and 804 on an otherwise conventional program storage device. In one embodiment, computers 802 and 804 may include a user interface 810, and/or a display interface 812 from which aspects of the disclosed embodiments can be accessed. The user interface 810 and the display interface 812, which in one embodiment can comprise a single interface, can be adapted to allow the input of queries and commands to the system, as well as present the results of the commands and queries, as described with reference to FIGS. 1, 3A and 3B for example.

The aspects of the disclosed embodiments are directed to providing a systematic way for directing a user of a system, such as system 100, to an area of communication network coverage when the user is located in an area devoid of network coverage. The aspects of the disclosed embodiments can be implemented in both emergency and non-emergency cases. In emergency cases the aspects of the disclosed embodiments provide for the transmission of an incident location to emergency personnel so that the emergency personal can be dispatched quickly and efficiently to the incident location without having to be lead to the incident location by a user of the system 100.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method comprising:
   detecting a communication call attempt in a portable communication device;
   determining whether the portable communication device is outside of a communication network coverage area;
   identifying data corresponding to a location of the portable communication device where the communication call attempt is detected if outside of the communication network coverage area and causing storage of the data in a memory of the portable communication device;
   determining at least one route from the location of the portable communication device where the communication call attempt is detected to at least one communication network coverage area, where the at least one route is a fastest or shortest route to the at least one communication network coverage area, a route to a closest communication network coverage area, a route back to a last known communication network coverage area, or a route to a predetermined coverage area corresponding to a predetermined network provider;
   causing display of the at least one route on a display of the portable communication device; and
   automatically establishing a communication connection and causing transmission of: a call corresponding to the communication call attempt, the data corresponding to the location of the portable communication device where the communication call is detected, and data corresponding to a present location of the portable communication device to a recipient when the user enters the at least one communication network coverage area.

2. The method of claim 1, wherein the location is determined by a global positioning system, a dead reckoning system or an inertial navigation system.

3. The method of claim 1, wherein the at least one route guides a user of the portable communication device to the at least one communication network coverage area for establishing communication between the portable communication device and a network.

4. The method of claim 1, further comprising:
   automatically determining at least one return route from the at least one communication network coverage area to the location of the portable communication device where the communication call attempt is detected; and
   causing display of the at least one return route on a display of the portable communication device for guiding a user of the portable communication device back to the location of the portable communication device where the communication call attempt is detected.

5. The method of claim 1, wherein the communication call attempt is an attempt to establish an emergency call.

6. The method of claim 1, wherein the at least one route is based on terrain and/or an ability of a user of the portable communication device to traverse the terrain between the location of the portable communication device where the communication call attempt is detected and the at least one communication network coverage area.

7. An apparatus comprising: at least one processor and at least one memory including computer program code, the at least one memory and the computer program code configured to, with the processor, cause the apparatus to at least:
detect a communication call attempt made with the apparatus;
determine whether the apparatus is outside of a communication network coverage area;
identify data corresponding to a location of the apparatus where the communication call attempt is detected if outside of the communication network coverage area;
cause storage of the data in a memory connected to the processor;
determine at least one route from the location of the apparatus where the communication call attempt is detected to at least one communication network coverage area, where the at least one route is a fastest or shortest route to the at least one communication network coverage area, a route to a closest communication network coverage area, a route back to a last known communication network coverage area, or a route to a predetermined coverage area corresponding to a predetermined network provider;
cause display of the at least one route on the display for guiding a user to the at least one communication network coverage area; and
automatically establish a communication connection and cause transmission of: a call corresponding to the communication call attempt, the data corresponding to the location of the portable communication device where the communication call is detected, and data corresponding to a present location of the portable communication device to a recipient when the user enters the at least one communication network coverage area.

8. The apparatus of claim 7, wherein the processor is further configured to: determine a location of the apparatus with one or more of a global positioning system, a dead reckoning system and an inertial navigation system.

9. The apparatus of claim 7, wherein the processor is configured to:
automatically determine at least one return route from the at least one communication network coverage area to the location of the apparatus where the communication call attempt is detected; and
present the at least one return route on the display for guiding a user of the apparatus back to the location of the apparatus where the communication call attempt is detected.

10. The apparatus of claim 7, wherein the communication call attempt is an attempt to establish an emergency call.

11. The apparatus of claim 7, wherein the at least one route is based on terrain and/or an ability of a user of the apparatus to traverse the terrain between the location of the apparatus where the communication call attempt is detected and the at least one communication network coverage area.

12. The apparatus of claim 7, wherein the apparatus is a mobile communication device.

13. A computer program product comprising at least one non-transitory computer-readable storage medium having computer-executable program code instructions stored therein, the computer-executable program code instructions comprising program code instructions to:
detect a communication call attempt in a portable communication device;
determine whether the portable communication device is outside of a communication network coverage area;
identify data corresponding to a location of the portable communication device where the communication call attempt is detected if outside of the communication network coverage area and causing storage of the data in a memory of the portable communication device;
determine at least one route from the location of the portable communication device where the communication call attempt is detected to at least one communication network coverage area, where the at least one route is a fastest or shortest route to the at least one communication network coverage area, a route to a closest communication network coverage area, a route back to a last known communication network coverage area, or a route to a predetermined coverage area corresponding to a predetermined network provider;
cause display of the at least one route on a display of the portable communication device; and
automatically establish a communication connection and cause transmission of: a call corresponding to the communication call attempt, the data corresponding to the location of the portable communication device where communication call is detected, and data corresponding to a present location of the portable communication device to a recipient when the user enters the at least one communication network coverage area.

14. The computer program product claim 13, wherein the location is determined by a global positioning system, a dead reckoning system or an inertial navigation system.

15. The computer program product claim 13, wherein the at least one route guides a user of the portable communication device to the at least one communication network coverage area for establishing communication between the portable communication device and a network.

16. The computer program product claim 13, wherein the computer-executable program code instructions comprise program code instructions to:
automatically determine at least one return route from the at least one communication network coverage area to the location of the portable communication device where the communication call attempt is detected; and
cause display of the at least one return route on a display of the portable communication device for guiding a user of the portable communication device back to the location of the portable communication device where the communication call attempt is detected.

17. The computer program product claim 13, wherein the communication call attempt is an attempt to establish an emergency call.

18. The computer program product claim 13, wherein the at least one route is based on terrain or an ability of a user of the portable communication device to traverse the terrain between the location of the portable communication device where the communication call attempt is detected and the at least one communication network coverage area.

* * * * *